United States Patent [19]

Trautman

[11] Patent Number: 4,498,823
[45] Date of Patent: Feb. 12, 1985

[54] RETRACTABLE VERTICAL RESTRAINT MECHANISM FOR AN AIRCRAFT CARGO SYSTEM

[75] Inventor: Robert D. Trautman, Seattle, Wash.

[73] Assignee: The Boeing Company, Seattle, Wash.

[21] Appl. No.: 428,433

[22] Filed: Sep. 29, 1982

[51] Int. Cl.³ .............................................. B64D 1/12
[52] U.S. Cl. .................................. 410/84; 244/118.1;
        244/137 R; 410/77
[58] Field of Search .................. 410/67, 69, 77, 78,
        410/79, 84; 244/118.1, 137 R, 137 L

[56] References Cited

U.S. PATENT DOCUMENTS

| | | | |
|---|---|---|---|
| 3,335,983 | 8/1967 | Mollon et al. | 244/137 R |
| 3,641,940 | 2/1972 | Evans | 410/79 |
| 3,693,920 | 9/1972 | Trautman | 410/77 |
| 3,698,679 | 10/1972 | Lang et al. | 410/69 |
| 3,796,397 | 3/1974 | Alberti | 410/79 |
| 3,927,622 | 12/1975 | Voigt | 410/79 |
| 3,986,460 | 10/1976 | Voigt et al. | 410/69 |
| 3,995,562 | 12/1976 | Nordstrom | 410/79 |
| 4,089,275 | 5/1978 | Pelletier | 410/79 |
| 4,415,298 | 11/1983 | Voigt | 410/69 |

Primary Examiner—Randolph Reese
Attorney, Agent, or Firm—Joan H. Pauly

[57] ABSTRACT

Parallel restraint rails (20, 22) each include a hinged vertical restraint lip (32) that pivots between a vertically-extending retracted position and a horizontally-extending cargo-restraining position. Each lip (32) is hinged by pins (34) carried by spaced lugs (33) attached in openings (30) in the rail (20, 22). A torsion spring (36) surrounds each pin (34) to urge the lip (32) into the retracted position. Stop blocks (35) on each lip (32) are each free to rotate past a pawl (41) when the pawl (41) is pivoted and held by a foot pedal (44) by the interconnection of a pin (47) extending from the pawl (41) and a cam surface (45) on the pedal (44). The pedal (44) and pawl (41) are carried by pivot pins (38, 37) and biased by springs (40, 39) within a housing (31) positioned in opening (30). The pawl (41) locks the lip (32) into its restraint position and latches the lip (32) into its retracted position. The pedal (44) is coupled to a warning flag (50) that visually indicates a failure of the pawl (41) to properly engage.

11 Claims, 10 Drawing Figures

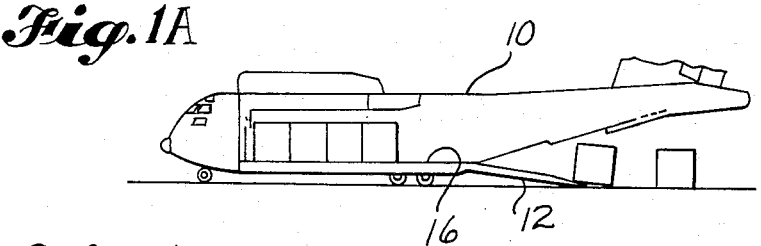
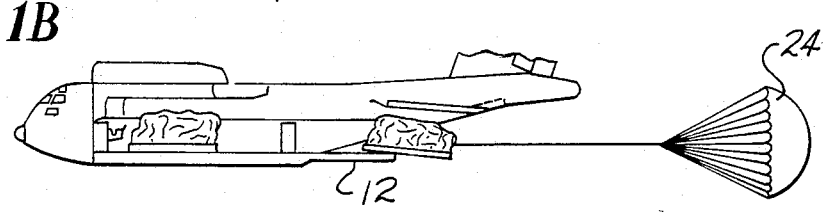
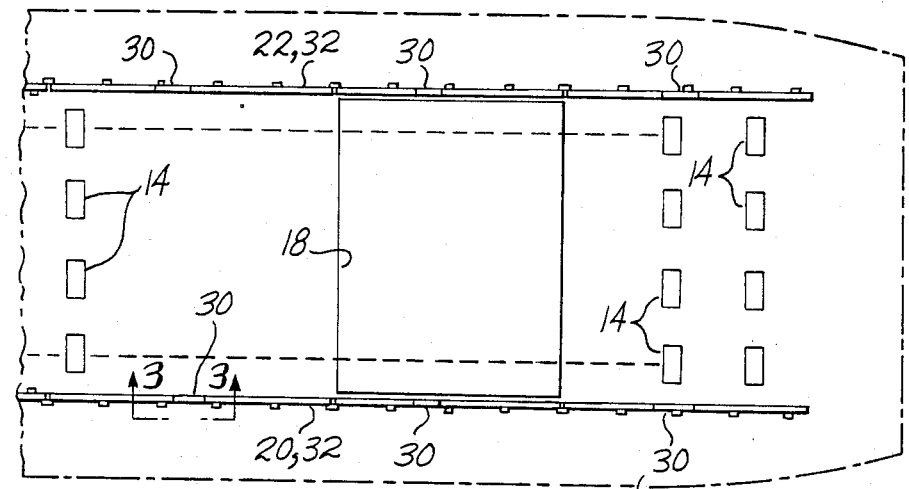

RETRACTABLE VERTICAL RESTRAINT MECHANISM FOR AN AIRCRAFT CARGO SYSTEM

TECHNICAL FIELD

This invention relates to retractable vertical restraint mechanisms and, more particularly, to such a mechanism that locks in a horizontally-extended restraint position, latches in a vertically-extended retracted position, requires deliberate effort to move from its restraint position to its retracted position or vice versa, and includes a warning flag to signal a failure to lock in the restraint position or to latch in the retracted position.

BACKGROUND ART

This invention is directed primarily to providing an improved retractable vertical restraint mechanism for use in an aircraft cargo handling and/or aerial delivery system. As is known, cargo drops by parachute from aircraft have been employed extensively in military operations and disaster relief situations. In the usual parachute cargo delivery system, loaded airdrop platforms are guided for movement along the longitudinal axis of the aircraft between parallel guidance and restraint rails secured to the aircraft floor. A continuous vertical restraint lip is incorporated into each of these rails. The platforms can be pulled backwardly out of a rear cargo receiving and delivery opening by means of a parachute during airdrop operations. Similarly, loaded pallets can be guided between the rails and pushed out of the opening and down a ramp onto the ground as the airplane taxis on a runway during combat off-load operations.

For that portion of the rails immediately forward of a hinged cargo ramp, the vertical restraint lips incorporated into the rails must be retractable to permit loading and unloading of cargo pallets and airdrop platforms when the cargo ramp is sloped. The retractable vertical restraint lips must be locked in the horizontally-extended restraint position to provide the necessary vertical restraint of the pallets and airdrop platforms during flight. Deliberate action must be required to unlock the retractable vertical restraint lips from the restraint position to avoid possible inadvertent unlocking by, for example, personnel unintentionally bumping a latch control with their feet. During airdrop of cargo, each retractable vertical restraint lip must be positively locked in the restraint position to prevent the airdrop platform from lifting out from between the restraint rails due to turbulence. Moreover, each retractable vertical restraint lip must provide a continuous and smooth lower surface without notches or edges that might obstruct the necessary movement of the platform should a platform lift during parachute extraction.

The vertical restraint lips must be movable into a retracted, non-restraining position to permit unloading of cargo down the inclined ramp during combat off-load operations. In this instance, inadvertent movement of a vertical restraint lip into a locked restraint position cannot be tolerated. Therefore, deliberate action must be required to move each vertical restraint lip from the retracted position into the restraint position. In view of the foregoing, a positive and readily visible indicator is necessary to inform personnel when a retractable vertical restraint lip is not latched in the retracted position.

It is desirable for each retractable vertical restraint lip to be foot operated and accessible for operation with or without pallets and/or airdrop platforms present between the restraint rails. When the retractable vertical restraint lips are in the restraint position, the top surfaces of the restraint rails should be continuous and smooth, without large notches or edges, to accommodate sliding of the foot on a force-transfer device during parachute extraction of the cargo.

The guidance and restraint rails in the cargo compartment may fold inboard for stowage. In such a case, hinged covers supported by the stowed rails may be used to provide a smooth, flat void-free floor in the cargo compartment. Therefore, the outboard face of the restraint rails with the retractable vertical restraint lips in the cargo-restraining position and/or the retracted position should provide a flush surface for stowage.

DISCLOSURE OF THE INVENTION

It is an object of the present invention to provide guidance and restraint rails with a retractable vertical restraint in an aircraft cargo handling and aerial delivery system wherein the vertical restraint is biased toward a retracted position to permit loading and unloading of cargo and movable into a horizontally-extended, cargo-restraining position to provide vertical restraint of cargo during flight and during airdrop operations and wherein the vertical restraint embodies a rugged and safer mechanism to achieve the necessary movements between the restraining and retracted positions.

In accordance with the present invention, a retractable vertical restraint mechanism is provided for an aircraft cargo handling and aerial delivery system wherein the cargo can be restrained in the vertical direction by restraint lips each hinged onto one of two spaced-apart and generally parallel guidance and restraint rails. The rails provide lateral guidance during loading and unloading or airdrop of cargo, and lateral restraint of cargo during flight. The restraint lips are hinged to the rails at a location above the support surface for the cargo so that the lips can be moved into and out of the restraint position with cargo pallets and/or airdrop platforms in position. The lips are locked in the cargo-restraining position by pawl assemblies that are integrated into the rails. Also, the lips are latched in the retracted position by the same pawl assemblies. Thus, deliberate action is required to move the lips from the retracted to the restraining position or vice versa. The lips are elongated in the direction of the rails, and each provides a continuous and smooth lower surface without notches or edges that might hinder parachute extraction of airdrop platforms.

The lips can be moved by pressing on the latch assemblies with the toe of the operator's boot. In this respect, the restraint mechanism of the present invention is particularly suitable for foot operation, which is safer and more convenient than finger-operation. Hence, fewer injuries result and the speed of operation is increased. Additionally, since the operator uses his foot to carry out the necessary movements of the restraint mechanism, the operator remains erect, resulting in an increased awareness of the surrounding conditions and less vulnerability to injury due to moving cargo. The operator is in a position to move quickly, and the necessity of bending over with the head near the floor is eliminated, thereby significantly reducing serious head injuries. In addition, the operator's task is easier to perform in an upright position.

Moreover, the restraint mechanism of the present invention embodies a design that offers simplicity, ruggedness, and foolproof operation. The restraint mechanism is made up of a minimum of component parts with a robust construction. While the retractable vertical restraint mechanism offers the advantage of a foot actuated operation, the restraint can be used in other applications requiring a latch which is either foot operated or manually operated, depending on the location and attitude of the restraint.

It is another object of the present invention to provide an improved latch mechanism that has utility in a variety of applications. According to a basic aspect of the invention, a latch mechanism comprises a retractable lip, resilient means, and at least one pawl assembly. The lip is adapted to be hinged onto a support structure to pivot between a restraint position in which it extends essentially perpendicularly from the support structure, and a retracted position. The resilient means urges the lip into its retracted position. Each pawl assembly controls hinged movement of the lip. Each pawl assembly includes a pivotal pawl member, resilient means, and a pivotal lever. Each pivotal pawl member is movable into locking engagement with the lip to prevent pivotal movement of the lip from its restraint position, and movable into latching engagement with the lip to prevent pivotal movement of the lip from its retracted position. The resilient means of each pawl assembly urges the pivotal pawl member into locking engagement with the lip. Each pivotal lever pivotally displaces and holds the pawl member in a retracted position to thereby permit movement of the lip into its retracted position or into its restraint position.

According to another basic aspect of the invention, a retractable vertical restraint mechanism is provided for use in a cargo handling system of the type having generally parallel guidance and restraint rails for lateral support of cargo units. The mechanism includes a retractable vertical restraint lip adapted to be hinged onto each of the rails, resilient means to urge each lip into a retracted position, and at least one pawl assembly to control hinged movement of each lip. Each lip pivots between a generally vertically-extended retracted position to permit vertical movement of a cargo unit relative to the rails and a generally horizontally-extended cargo-restraining position for vertically restraining a cargo unit. Each pawl assembly includes a pivotal pawl member, resilient means, and a pivotal lever. The pawl member is movable into locking engagement with the lip to prevent pivotal movement of the lip from the cargo-restraining position. It is also movable into latching engagement with the lip to prevent pivotal movement of the lip from the retracted position. The resilient means urges the pawl member into locking engagement with the lip. The lever pivotally displaces and holds the pawl member in a retracted position to thereby permit movement of the lip into its retracted position or into its cargo-restraining position.

According to another aspect of the invention, there is provided a retractable vertical restraint mechanism to permit loading and unloading of cargo units in a cargo handling and aerial delivery system for an aircraft having a cargo ramp sloped relative to the floor of a cargo compartment. The restraint mechanism includes generally parallel guidance and restraint rails for lateral support of a cargo unit within the cargo compartment. The mechanism also includes a retractable vertical restraint lip hinged onto each of the rails to pivot between a generally vertically-extended retracted position to permit vertical movement of a cargo unit relative to the rails and a generally horizontally-extended cargo-restraining position for vertically restraining a cargo unit. The mechanism further includes resilient means to urge each lip into the retracted position, and at least one pawl assembly to control hinged movement of each lip. Each pawl assembly includes a pivotal pawl member movable into locking engagement with the lip to prevent pivotal movement of the lip from the cargo-restraining position, and movable into latching engagement with the lip to prevent pivotal movement of the lip from the retracted position. Each pawl assembly also includes resilient means urging the pivotal pawl member into locking engagement with the lip, and a pivotal foot pedal to pivotally displace and hold the pawl member in a retracted position to thereby permit movement of the lip into its retracted position or into its cargo-restraining position.

According to a preferred aspect of the invention, each of the rails includes an opening in the side thereof and a warning flag that has a pivot at one end supported by the rail within the opening. A control linkage is coupled to the flag and the pivotal foot pedal to pivotally displace the flag from the opening in the rail.

Each of the rails preferably includes a plurality of openings arranged at spaced-apart locations along the length thereof with a pawl assembly supported in each of the openings. Preferably, the pawl assembly includes a housing for the opening, which housing is attached to the rail and includes means to pivotally support a pawl member and a foot pedal.

According to another preferred aspect of the invention, the restraint lip for each rail includes an elongated restraint bar having spaced-apart, laterally-projecting bifurcations each forming a hinged lug means and a lip stop. A pivot pin is carried by and extends in a generally parallel relation with the rail for supporting the lip by the hinge lug means. The lip stop is arranged for engagement with a pivotal pawl member to prevent pivotal movement of the lip from the cargo-restraining position.

According to still another preferred aspect of the invention, the pivotal foot pedal has a cam surface extending to a notch, and the pawl member has a projecting pin to move along the cam surface and into the notch to pivot and hold the pawl member in its retracted position. This camming action provides an essentially automatic latching of the pawl member into a retracted position.

Preferably, when the lip moves from its retracted position to its cargo-restraining position or vice versa, a portion of the lip contacts a portion of the pawl member to move the projecting pin out of the notch and allow the pawl member to move into engagement with the lip. This feature provides an essentially automatic locking or latching of the lip. Both this feature and the camming action described above greatly contribute to the ease and safety of operation of the restraint mechanism.

Other preferred features of the invention include supporting the foot pedal and the pawl member by spaced-apart and generally parallel pivot pins, and/or providing the pawl assembly with resilient means to urge the foot pedal in a direction for moving the pawl member into locking engagement with a restraint lip.

These features and advantages of the present invention as well as others will be more fully understood when the following description is read in light of the accompanying drawings which form a part of this specification.

BRIEF DESCRIPTION OF THE DRAWINGS

In the drawings, like element designates refer to like parts throughout, and:

FIGS. 1A and 1B illustrate two modes of operation of a cargo aircraft with which the present invention may be used;

FIG. 2 is a top view of the aft portion of the guidance and restraint rails used in the cargo aircraft of FIGS. 1A and 1B and into which the vertical restraint lips of the present invention are incorporated;

BEST MODE FOR CARRYING OUT THE INVENTION

Figure 4:
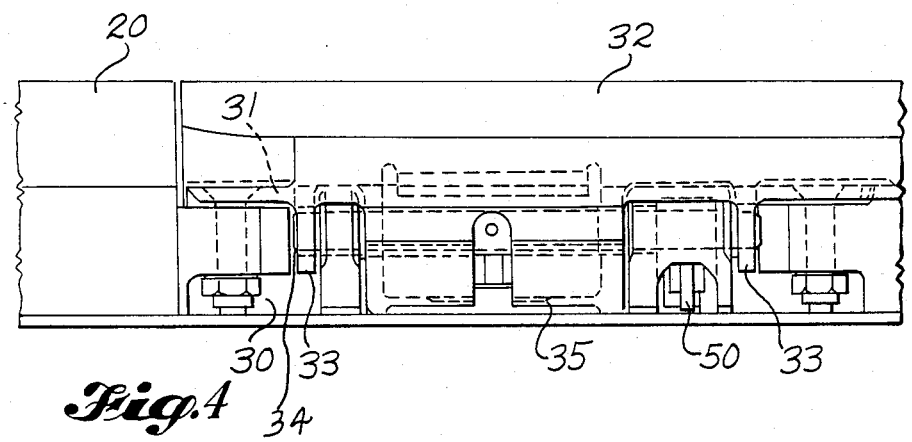
FIG. 4 is a top view of the restraint system shown in FIG. 3.

With reference now to the drawings and particularly to FIGS. 1A and 1B, there is shown a cargo aircraft 10 having, in the aft portion of its underside, a cargo receiving and delivery ramp 12. Cargo is normally placed on pallets or airdrop platforms which, in turn, are mounted on rollers 14 (FIG. 2) projecting upwardly from the aircraft cargo compartment floor 16. The pallets and airdrop platforms, one of which is shown in FIG. 2 and identified by reference number 18, are guided for aft or forward movement between generally parallel and spaced-apart guidance and restraint rails 20 and 22. The portion of each rail immediately forward of the cargo ramp hinge is provided along its upper inboard edge with a retractable vertical restraint lip preferably in the form of an elongated restraint bar having spaced-apart, laterally projecting bifurcations each forming hinge lugs and a lip stop for controlling pivotal movement of the lip from a cargo-restraining position wherein one, but preferably a plurality of pallets, are restrained against vertical movement as will be hereinafter described.

In FIG. 1A, the aircraft 10 is shown as taxiing over the ground surface in what is called the combat off-load mode of operation. In this mode of operation, all of the pallets are unloaded from the aircraft cargo compartment by moving them backwardly and onto the sloped ramp 12 and allowing them to move down the ramp 12 to the ground surface as the aircraft accelerates. The retractable vertical restraint lips must be latched and remain in the retracted position to permit the cargo pallets to tilt and move onto the sloped ramp 12.

In FIG. 1B, the airdrop mode of operation is shown wherein a parachute 24 attached to an airdrop platform extends and pulls the platform backwardly through the cargo receiving and delivery opening. In this mode of operation, the platform must be restrained against vertical lifting movement by the retractable vertical restraint lips.

The details of the vertical restraint mechanism on each of the rails 20 and 22 are shown in FIGS. 3-8. Each rail 20, 22 has a plurality of (typically three) openings or cutouts 30 at spaced locations along its length. A housing or intermediate support frame 31 is positioned within each opening with its inboard surface flush with the inboard surface of the rail 20, 22 and minimum gaps between the housing 31 and the rail 20, 22. Each housing 31 has flanges by which the housing 31 is attached to the rail 20, 22 in the opening 30 in the rail 20, 22. The housings 31 facilitate manufacture of the vertical restraint system and restore structural integrity to the rails 20, 22.

Figure 5:
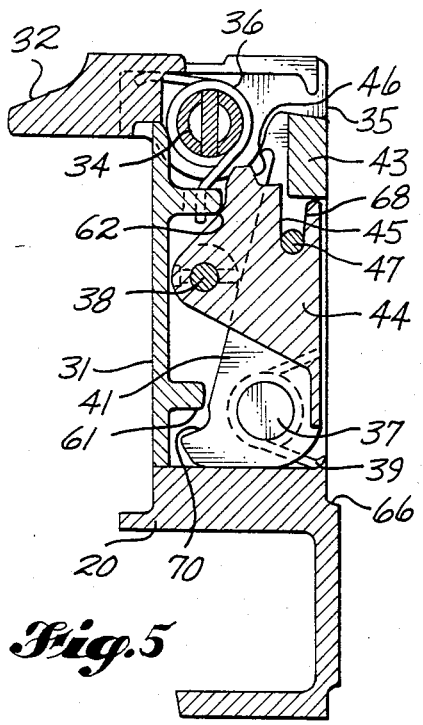
FIG. 5 is a sectional view taken along line 5—5 of FIG. 3 and showing the arrangement of the operating parts of the restraint system in the position for vertically restraining cargo.

Each rail 20, 22 is provided with a vertical restraint lip 32 that is pivoted on each housing 31 in the rail. Each lip 32 has integral laterally projecting bifurcations at spaced-apart locations along its length. The bifurcations project from the lip 32 at the site of each cutout 30 and housing 31. The bifurcations include hinge lugs 33 that receive a hinge pin 34 and a projecting lip stop 35 extending between and outboard of the lugs 33. The restraint lip 32 is urged to pivot about each of its hinge pins 34 by a torsion spring 36 that is received on the hinge pin 34 and has one end supported by the lip 32 and the other end supported by the housing 31, as best shown in FIG. 5. The hinge pin 34 extends in a generally parallel relation with the extended length of the restraint lip 32.

Separate, relatively short hinge pins 34, rather than one long pin for the entire length of the lip 32, are used. Each hinge pin 34 is free to rotate in a bushing relative to both the lip 32 and the rail 20, 22. Each pin 34 is free to float longitudinally and has a relatively loose fitting. The use of noncontinuous hinge pins 34 and the loose fittings should eliminate any binding at the hinge joints and, along with the multiple torsion springs 36, help ensure that the lip 32 will spring to its retracted position when unlocked from engagement with the pawl 41. Any binding problem that might develop due to accumulated dirt and/or corrosion would develop gradually and would be correctable by maintenance.

Extending in the same general relation are pivot pins 37 and 38, each supported by the housing 31 and carrying torsion springs 39 and 40, respectively. The pivot pin 37 is actually made up of two cantilevered pin sections, each surrounded by a torsion spring 39 that is supported at one end by the associated restraint rail 20, 22 and engaged at the other end with a pawl 41. The pawl is pivotally supported on the housing 31 by the two pivot pins 37 at the lower outboard side of the restraint rail 20, 22. The pawl 41 has a central opening 42 above which the pawl forms a stop block 43 to engage the lip stop 35 when the restraint lip 32 is moved into the horizontally-extended, cargo-restraining position, as shown in FIG. 5.

The pivot pin 38 is supported at its opposite ends by the housing 31 between pivot pin 37 and hinge pin 34. Pivot pin 38 carries a torsion spring 40 supported at one end by the housing 31 and engaging a lever or foot pedal 44. The opening 42 in the pawl 41 is arranged to expose a broad face of the foot pedal 44 for contact by the boot of an operator. By this contact, the foot pedal 44 is moved about the pivot pin 38 against the force developed by spring 40. The upper part of the foot pedal 44 includes a cam surface 45 extending to a notch 46 that contacts a follower pin 47 on the pawl 41, forming a mechanical interconnection between the pedal 44 and the pawl 41. The follower pin 47 extends axially parallel to pawl pivot pin 37.

Figure 3:
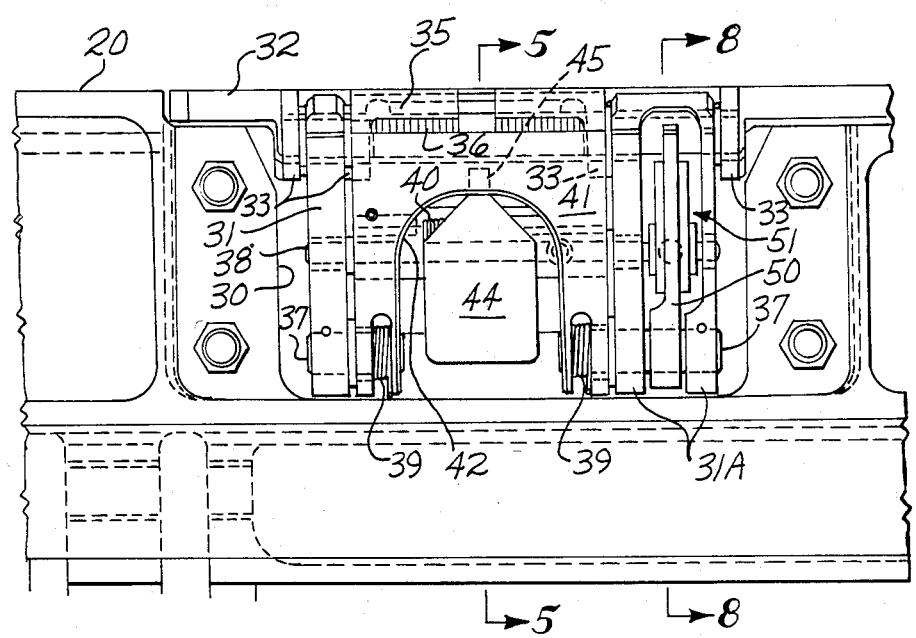
FIG. 3 is an enlarged elevational view of a vertical restraint lip and the operating mechanism therefor, taken along line 3—3 of FIG. 2.
Figure 8:
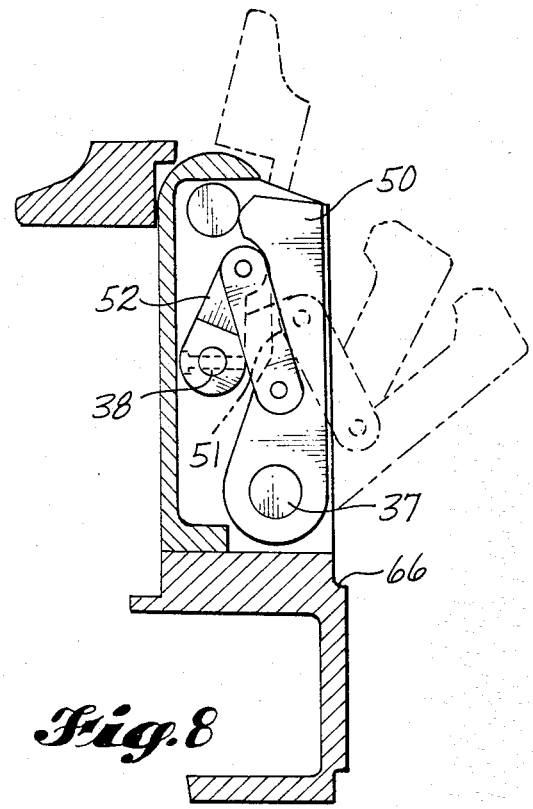
FIG. 8 is a sectional view taken along line 8—8 of FIG. 3, showing the warning flag in both its recessed and protruding positions.

A warning flag 50 is supported by each housing 31 at one lateral side of the pawl 41 to provide a visual indication when the restraint lip 32 is not locked in the cargo-restraining position or is not latched in the retracted position. As shown in FIGS. 3 and 8, the warning flag 50 is attached at its lower end to one of the pivot pins 37 which has an extended length to project between spaced-apart and vertically-extending frame post members 31A of the housing 31. A linkage, made up of two adjoined levers 51 and 52, controls pivotal movement of the flag 50 about the pivot pin 37. The free end of lever 51 is connected to the flag 50 while the free end of lever 52 is connected to and supported by an extended end of pivot pin 38. Rotation of foot pedal 44 inboard results in rotation of pivot pin 38 and, hence, in rotation of lever 52, which causes warning flag 50 to protrude outboard from housing 31. (See FIG. 8.)

Figure 9:
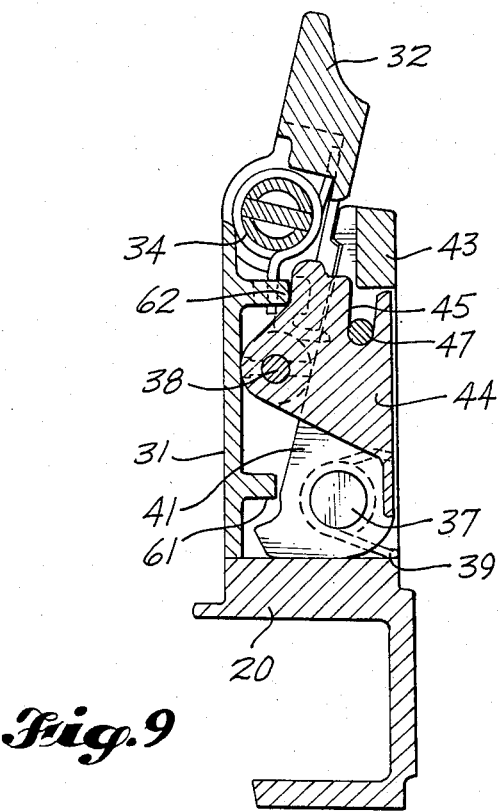
FIG. 9 is a view similar to FIGS. 5-7 but showing the mechanism with the lip latched in a retracted position.

The restraint lips 32 are retractable by pivotal movement about hinge pins 34 supported at the upper inboard edges of the restraint rails 20, 22 via housing 31. The restraint lips 32 are urged by torsion springs 36 into the retracted (erect) position (see FIG. 9) wherein the lips extend in a generally vertical relation to clear vertical access to the space between rails 20, 22 for loading of cargo pallets and airdrop platforms with the cargo ramp 12 in a sloped relation to the cargo compartment floor 16. Each of the restraint lips 32 may be moved from its retracted position to a cargo-restraining position in which the lip 32 extends horizontally above a peripheral lip on the bottom of a cargo pallet or airdrop platform positioned between the rails 20, 22. Both lateral and vertical clearance are provided between the pallet or platform and restraint mechanism to accommodate variations in the dimensions of the pallet or platform, the restraint mechanism, the rails 20, 22, and-/or the space between the rails 20, 22. To achieve the cargo-restraining position, the operator unlatches the lip 32 from its retracted position by depressing the foot pedal 44 of each latch mechanism with the toe of a boot and then, also with the toe of a boot, pushing the lip 32 against the force of torsion springs 36 into its horizontally-extended, cargo-restraining position.

The lip 32 on each rail 20, 22 is locked in the cargo-restraining position by pawls 41 to prevent lifting and vertical movement of cargo; and each lip 32 is latched in the retracted position, by engagement of a protruding lip 60 on each pawl 41 with a notch 63 in the restraint lip 32, for loading and, in certain modes of operation, unloading of cargo. The pawl 41 at each location along the length of the rails 20, 22 is disengaged from the locking and latching positions by pressing on the corresponding foot pedal 44 and moving it to the inboard position against a stop 61 in the housing 31. The foot pedal 44 is sprung toward its outboard position, i.e., pivoted away from stop 61, by spring 40. In its outboard position, pedal 44 is flush with the outboard vertical surface of housing 31 and rail 20, 22, and it is held in position by pin 47. In this position, both pedal 44 and pawl 41 are substantially flush with the housing 31 and the rail 20, 22 so that the outboard side of the rail 20, 22 is free from protrusions that could cause personnel to stumble and/or inadvertently activate the mechanism. However, a recess 66 is preferably provided to receive a cover when the rails 20, 22 are folded to provide conversion to a smooth, flat cargo compartment floor.

Figure 6:
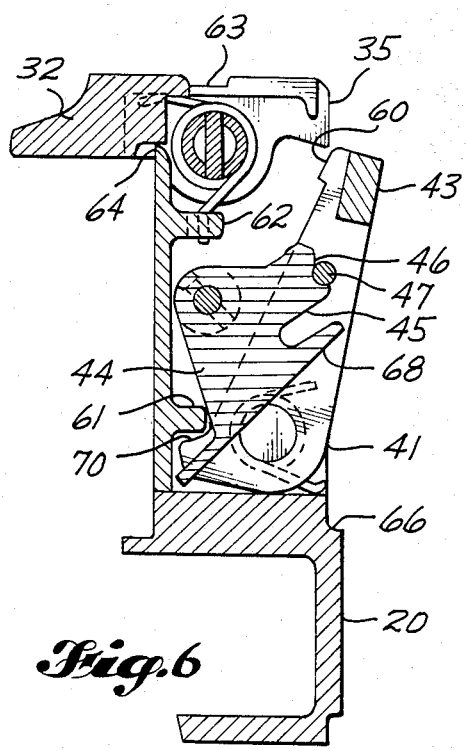
FIG. 6 is a sectional view similar to FIG. 5 but illustrating the operating mechanism in an unlocked position prior to movement of the lip into its retracted position.
Figure 7:
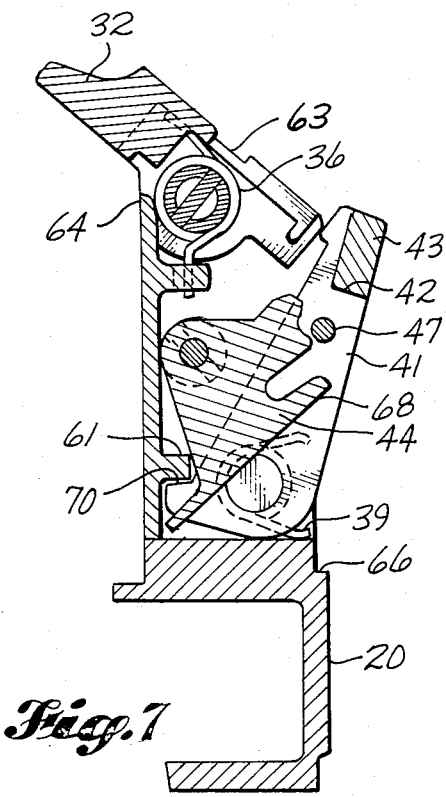
FIG. 7 is a view similar to FIGS. 5 and 6 but illustrating movement of the lip between the restraining position and the retracted position and the resulting unlatching of the mechanical interconnection between the pawl and the pedal.

When the pedal 44 is moved into its inboard position, pawl 41 is rotated about its pivot pins 37 against the force of springs 39 by the camming action of pin member 47 moving along cam surface 45 from the position shown in FIG. 5 to the position shown in FIG. 6. The pin member 47 moves for support into notch 46 to latch the pawl 41 in its outboard position. Each foot pedal 44 at the various locations along the rail 20, 22 must be pushed in against stop 61 to move the pin 47 into notch 46 and thereby latch the pawl 41 in an outboard position. The pedals 44 may be depressed in any sequence. After the operator has moved each pedal 44 in a rail 20, 22 into the inboard position, the torsion springs 36 rotate the vertical restraint lip 32 to its retracted position, in which it rests against stop surface 62 of housing 31. As the lip 32 moves toward its retracted position, each lip stop 35 contacts the protruding lip 60 on the corresponding pawl 41 and moves pawl 41 outboard and pin 47 out of engagement with notch 46. (See FIG. 7) Stop 70 on pawl 41 contacts stop 61 on the housing 31 to limit the outboard movement of pawl 41. Then, torsion springs 39 rotate pawls 41 into a vertical flush position in which they latch the restraint lip 32 into its retracted position, and torsion springs 40 rotate pedals 44 into their outboard flush positions.

As each pedal 44 is moved into its inboard position, it moves the corresponding pawl 41 and its stop block 43 to the position shown in FIG. 6, whereupon the corresponding lip stop 35 is free of the stop block 43 of pawl 41. When all the stops 35 on a lip 32 are free of their corresponding pawls 41, the lip 32 assumes its retracted position, in which it extends generally vertically upwardly from the rail 20, 22.

It is intended that each foot pedal 44 must be rotated a sufficient distance to move the pin 47 into the notch 46 to achieve the unlocking operation. Since each pedal 44 must be moved in this manner, inadvertent unlocking of a restraint lip 32 is avoided. An operator who fails to achieve the correct positioning must "try again". The provision of finger 68 adds to the foolproof nature of the operation of the mechanism since it prevents the pedal 44 from returning to its flush position if, for any reason, the pawl 41 sticks in an unsafe outboard position. The movement of the pedal 44 toward the stop 61 brings about a concurrent displacement of the warning flag 50, as described above. Thus, when any foot pedal 44 is moved into and remains in its inboard or an intermediate position, there is an indicator warning of the unlatched or unlocked position of the pawl 41.

The restraint lip 32 hinged onto each rail 20, 22 may be latched by the pawls 41 in a vertically-extended, retracted position with each warning flag 50 associated with a latch assembly flush with the outboard face of a housing 31 in the rail 20, 22. When it is desired to move the restraint lip 32 into the cargo-restraining position, each pawl 41 is unlatched by pressing the foot pedal 44 against stop 61. The pedals 44 may be depressed in any sequence. Each pedal 44 will remain in the depressed inboard position, latching the pawl 41 in an outboard position, as shown on the right side of FIG. 6. The operator then presses on the restraint lip 32 with the toe of his boot in the vicinity of the nearest latch assembly, thereby rotating the lip 32 against a stop surface 64 provided by the housing 31 and into a position in which it extends horizontally from the rail 20, 22. As the lip 32 moves toward its horizontally-extended restraint position, each lip stop 35 contacts the protruding lip 60 on the corresponding pawl 41 and moves the pawl 41 outboard and pin 47 out of engagement with notch 46. (See FIG. 7 for the positions of pawl 41 and pedal 44.) Then, pawl 41 of the nearest latch assembly rotates, due to the force of torsion springs 39, into the position, shown in FIG. 5, locking the retractable lip 32 in the cargo-restraining position, and pedal 44 rotates to its flush position.

The operator then moves to the vicinity of a different latch assembly and again presses with the toe of his boot on the lip 32 to rotate the lip 32 into contact with stop surface 64 on housing 31, thereby allowing the pawl 41 to rotate into its inboard position and lock the lip 32 into its restraint position. A slight additional rotation of the lip 32 is all that is needed for this purpose. It is necessary to press the lip 32 into position in each location because of the flexibility of the long lip 32 of the preferred embodiment.

The pawl 41 of each latch assembly will rotate to locking position and the foot pedal 44 will rotate to its outboard flush position as the restraint lip 32 is moved to the cargo-restraining position. However, in the event any one of the pawls 41 fails to return to the locking position, the warning flag 50 will remain in a position protruding from the housing 31 in the rail 20, 22, giving a visual indication that the pawl 41 is not in position locking the lip 32 in its restraint position.

Throughout the description of the structure and operation of the preferred embodiment of the mechanism of this invention, the terms "vertical", "horizontal", and the like have been used. These terms have been used for the purpose of illustrating a typical use attitude of the mechanism. The terms are not intended to indicate that the use attitude of the mechanism is limited to one particular attitude, and it is intended to be understood that the mechanism of this invention can be used to advantage in other attitudes and in a large variety of situations.

Although the invention has been shown in connection with a specific embodiment in a specific environment, it will be readily apparent to those skilled in the art that various changes in form and arrangement of parts may be made to suit requirements and that the invention may be used in other environments without departing from the spirit and scope of the invention as set forth in the following claims.

What is claimed is:

1. A latch mechanism comprising:
   a retractable lip adapted to be hinged onto a support structure to pivot between a restraint position in which it extends essentially perpendicularly from the support structure, and a retracted position; resilient means to urge the lip into its retracted position; and at least one pawl assembly to control hinged movement of the lip, each pawl assembly including (a) a pivotal pawl member movable into locking engagement with the lip to prevent pivotal movement of the lip from said restraint position, and movable into latching engagement with the lip to prevent pivotal movement of the lip from the retracted position, (b) resilient means urging said pivotal pawl member into locking engagement with the lip, and (c) a pivotal lever to pivotally displace and hold the pawl member in a retracted position to thereby permit movement of the lip into its retracted position or into its restraint position.

2. For use in a cargo handling system of the type having generally parallel guidance and restraint rails for lateral support of cargo units, a retractable vertical restraint mechanism, said mechanism including a retractable vertical restraint lip adapted to be hinged onto each of said rails to pivot between a generally vertically-extended retracted position to permit vertical movement of a cargo unit relative to said rails and a generally horizontally-extended cargo-restraining position for vertically restraining a cargo unit, resilient means to urge each lip into the retracted position, and at least one pawl assembly to control hinged movement of each lip, each pawl assembly including (a) a pivotal pawl member movable into locking engagement with the lip to prevent pivotal movement of the lip from said cargo-restraining position, and movable into latching engagement with the lip to prevent pivotal movement of the lip from the retracted position, (b) resilient means urging said pivotal pawl member into locking engagement with the lip, and (c) a pivotal lever to pivotally displace and hold the pawl member in a retracted position to thereby permit movement of the lip into its retracted position or into its cargo-restraining position.

3. In an aircraft cargo handling and aerial delivery system, a retractable vertical restraint mechanism to permit loading and unloading of cargo units in an aircraft having a cargo ramp sloped relative to the floor of a cargo compartment, said retractable vertical restraint mechanism including generally parallel guidance and restraint rails for lateral support of a cargo unit within said cargo compartment, a retractable vertical restraint lip hinged onto each of said rails to pivot between a generally vertically-extended retracted position to permit vertical movement of a cargo unit relative to said rails and a generally horizontally-extended cargo-restraining position for vertically restraining a cargo unit, resilient means to urge each lip into the retracted position, and at least one pawl assembly to control hinged movement of each lip, each pawl assembly including (a) a pivotal pawl member movable into locking engagement with the lip to prevent pivotal movement of the lip from said cargo-restraining position, and movable into latching engagement with the lip to prevent pivotal movement of the lip from the retracted position, (b) resilient means urging said pivotal pawl member into locking engagement with the lip, and (c) a pivotal foot pedal to pivotally displace and hold the pawl member in a retracted position to thereby permit movement of the lip into its retracted position or into its cargo-restraining position.

4. The retractable vertical restraint mechanism according to claim 3 wherein each of said rails includes an opening in the side thereof, a warning flag including a pivot at one end supported by the rail within said opening, and a control linkage coupled to said flag and said pivotal foot pedal to pivotally displace the flag from the opening in the rail.

5. The retractable vertical restraint mechanism according to claim 3 wherein each of said rails includes a plurality of openings arranged at spaced-apart locations along the length thereof, and a pawl assembly supported within each of the openings.

6. The retractable vertical restraint mechanism according to claim 3 wherein each of said rails includes openings at spaced-apart locations along the length thereof, and wherein said pawl assembly includes a housing for each of said openings and attached to the rail, said housing including means to pivotally support a pawl member and a foot pedal forming said pawl assembly.

7. The retractable vertical restraint mechanism according to claim 3 wherein said restraint lip for each rail includes an elongated restraint bar having spaced-apart, laterally-projecting bifurcations each forming a hinge lug means and a lip stop, a pivot pin carried by and extending in a generally parallel relation with the rail for supporting said restraint lip by said hinge lug means, said lip stop being engageable with a pawl member to prevent pivotal movement of the lip from said cargo-restraining position.

8. The retractable vertical restraint mechanism according to claim 7 wherein said pivotal foot pedal includes a cam surface extending to a notch, and wherein said pawl member includes a projecting pin to move along said cam surface and into said notch to pivot and hold the pawl member in its retracted position.

9. The retractable vertical restraint mechanism according to claim 8 wherein, when the lip moves from its retracted position to its cargo-restraining position or vice versa, a portion of the lip contacts a portion of the pawl member to move the projecting pin out of the notch and allow the pawl member to move into engagement with the lip.

10. The retractable vertical restraint mechanism according to claim 7 wherein said pawl assembly further includes resilient means to urge said pivotal foot pedal in a direction for moving the pawl member into locking engagement with a restraint lip.

11. The retractable vertical restraint mechanism according to claim 3 wherein said pivotal foot pedal and said pivotal pawl member are supported by spaced-apart and generally parallel pivot pins.

* * * * *